US008621477B2

(12) United States Patent
Ferdous et al.

(10) Patent No.: US 8,621,477 B2
(45) Date of Patent: Dec. 31, 2013

(54) REAL-TIME MONITORING OF JOB RESOURCE CONSUMPTION AND PREDICTION OF RESOURCE DEFICIENCY BASED ON FUTURE AVAILABILITY

(75) Inventors: Rashed Ferdous, Rochester, MN (US); Arthur J. Meyer, III, Oronoco, MN (US); Carlos P. Sosa, Eagan, MN (US)

(73) Assignee: International Business Machines Corporation, Armonk, NY (US)

( * ) Notice: Subject to any disclaimer, the term of this patent is extended or adjusted under 35 U.S.C. 154(b) by 212 days.

(21) Appl. No.: 12/915,140

(22) Filed: Oct. 29, 2010

(65) Prior Publication Data
US 2012/0110582 A1    May 3, 2012

(51) Int. Cl.
*G06F 9/46* (2006.01)
(52) U.S. Cl.
USPC .......................................... 718/104
(58) Field of Classification Search
None
See application file for complete search history.

(56) References Cited

U.S. PATENT DOCUMENTS

| | | | | |
|---|---|---|---|---|
| 6,738,736 B1 * | 5/2004 | Bond | | 703/2 |
| 6,760,684 B1 * | 7/2004 | Yang et al. | | 702/182 |
| 6,952,828 B2 * | 10/2005 | Greene | | 718/104 |
| 7,203,746 B1 * | 4/2007 | Harrop | | 709/224 |
| 7,225,250 B1 * | 5/2007 | Harrop | | 709/224 |
| 7,249,179 B1 | 7/2007 | Romero et al. | | |
| 7,284,052 B1 * | 10/2007 | Anderson | | 709/226 |
| 7,668,671 B1 | 2/2010 | Gristina | | |
| 7,712,100 B2 | 5/2010 | Fellenstein et al. | | |
| 7,770,173 B2 * | 8/2010 | Farrell et al. | | 718/104 |
| 7,774,457 B1 * | 8/2010 | Talwar et al. | | 709/224 |
| 7,895,071 B2 * | 2/2011 | Khosla et al. | | 705/7.12 |
| 7,958,511 B1 * | 6/2011 | Pomerantsev et al. | | 718/104 |
| 8,037,185 B2 * | 10/2011 | Steinder et al. | | 709/226 |
| 8,037,475 B1 * | 10/2011 | Jackson | | 718/104 |
| 8,112,756 B2 * | 2/2012 | Cherkasova et al. | | 718/104 |
| 8,250,581 B1 * | 8/2012 | Blanding | | 718/104 |
| 8,312,460 B1 * | 11/2012 | Blanding | | 718/104 |
| 8,336,054 B2 * | 12/2012 | Cherkasova et al. | | 718/104 |
| 8,365,182 B2 * | 1/2013 | Groetzner et al. | | 718/104 |
| 8,402,468 B2 * | 3/2013 | Seidman et al. | | 718/104 |
| 8,434,084 B2 * | 4/2013 | Ferdous et al. | | 718/101 |
| 8,438,570 B2 * | 5/2013 | Ferdous et al. | | 718/101 |
| 8,505,022 B2 * | 8/2013 | Helander | | 718/104 |

(Continued)

OTHER PUBLICATIONS

Unpublished U.S. Appl. No. 12/848,126, Ferdous et al.

(Continued)

*Primary Examiner* — Abdullah Al Kawsar
*Assistant Examiner* — Banjamin Wu
(74) *Attorney, Agent, or Firm* — Marcia L. Doubet

(57) ABSTRACT

Techniques used to enhance the execution of long-running or complex software application instances and jobs on computing systems are disclosed herein. In one embodiment, a real time, self-predicting job resource monitor is employed to predict inadequate system resources on the computing system and failure of a job execution on the computing system. This monitor may not only determine if inadequate resources exist prior to execution of the job, but may also detect in real time if inadequate resources will be encountered during the execution of the job for cases where resource availability has unexpectedly decreased. If a resource deficiency is predicted on the executing computer system, the system may pause the job and automatically take corrective action or alert a user. The job may resume after the resource deficiency is met. Additional embodiments also integrate this resource monitoring capability with the adaptive selection of a computer system or application execution environment based on resource capability predictions and benchmarks.

5 Claims, 3 Drawing Sheets

(56) References Cited

U.S. PATENT DOCUMENTS

| | | |
|---|---|---|
| 2003/0028642 A1* | 2/2003 | Agarwal et al. ............... 709/226 |
| 2004/0083116 A1 | 4/2004 | Joyce |
| 2004/0098291 A1* | 5/2004 | Newburn ............................ 705/8 |
| 2005/0027865 A1* | 2/2005 | Bozak et al. ................... 709/226 |
| 2005/0055590 A1* | 3/2005 | Farkas et al. .................. 713/320 |
| 2005/0081208 A1* | 4/2005 | Gargya et al. ................. 718/100 |
| 2005/0188088 A1* | 8/2005 | Fellenstein et al. ........... 709/226 |
| 2005/0198636 A1* | 9/2005 | Barsness et al. .............. 718/100 |
| 2005/0240668 A1* | 10/2005 | Rolia et al. .................... 709/223 |
| 2005/0256826 A1 | 11/2005 | Hambrick et al. |
| 2005/0283534 A1* | 12/2005 | Bigagli et al. ................. 709/229 |
| 2005/0283788 A1 | 12/2005 | Bigagli et al. |
| 2006/0059492 A1* | 3/2006 | Fellenstein et al. ........... 718/104 |
| 2006/0095917 A1* | 5/2006 | Black-Ziegelbein et al. . 718/104 |
| 2006/0123184 A1 | 6/2006 | Mondal et al. |
| 2006/0136638 A1 | 6/2006 | Banning et al. |
| 2006/0167984 A1* | 7/2006 | Fellenstein et al. ........... 709/203 |
| 2006/0168584 A1* | 7/2006 | Dawson et al. ................ 718/104 |
| 2006/0184287 A1* | 8/2006 | Belady et al. .................. 700/291 |
| 2006/0190430 A1* | 8/2006 | Luo et al. ............................ 707/3 |
| 2006/0190944 A1* | 8/2006 | Moon et al. .................... 718/104 |
| 2007/0022426 A1* | 1/2007 | Steinder et al. ................ 718/104 |
| 2007/0038744 A1* | 2/2007 | Cocks et al. ................... 709/224 |
| 2007/0143758 A1* | 6/2007 | Coppinger et al. ............ 718/102 |
| 2007/0143765 A1* | 6/2007 | Aridor et al. ................... 718/104 |
| 2007/0219944 A1* | 9/2007 | Liu et al. ............................ 707/2 |
| 2007/0250629 A1 | 10/2007 | Blanding et al. |
| 2007/0255835 A1 | 11/2007 | Coppinger et al. |
| 2007/0300239 A1* | 12/2007 | Adam et al. ................... 719/320 |
| 2008/0086734 A1* | 4/2008 | Jensen et al. ................... 718/104 |
| 2008/0120619 A1 | 5/2008 | Podila |
| 2008/0126165 A1* | 5/2008 | Buchner ............................ 705/8 |
| 2008/0127193 A1 | 5/2008 | Ishisaka et al. |
| 2008/0172673 A1* | 7/2008 | Naik ............................... 718/104 |
| 2008/0178179 A1 | 7/2008 | Natarajan et al. |
| 2009/0187521 A1 | 7/2009 | Lake |
| 2009/0187606 A1 | 7/2009 | Allweil et al. |
| 2009/0222540 A1* | 9/2009 | Mishra et al. .................. 709/222 |
| 2009/0265712 A1* | 10/2009 | Herington ...................... 718/103 |
| 2010/0005473 A1* | 1/2010 | Blanding et al. ............... 718/104 |
| 2010/0115095 A1* | 5/2010 | Zhu et al. ....................... 709/226 |
| 2010/0131959 A1* | 5/2010 | Spiers et al. ................... 718/105 |
| 2010/0199267 A1* | 8/2010 | Rolia et al. .................... 717/135 |
| 2010/0250642 A1* | 9/2010 | Yellin et al. .................... 709/201 |
| 2010/0271956 A1* | 10/2010 | Diwakar et al. ............... 370/242 |
| 2011/0022586 A1 | 1/2011 | Wilkinson et al. |
| 2012/0159367 A1* | 6/2012 | Calcaterra et al. ............ 715/771 |
| 2012/0331476 A1* | 12/2012 | Saffre ............................ 718/104 |

OTHER PUBLICATIONS

Lilian Noronha Nassif, et al., "Job Completion Prediction in Grid Using Distributed Case-based Reasoning," 2005; 6 pages.

Michael B. Jones, "Adaptive Real-Time Resource Management Supporting Modular Composition of Digital Multimedia Services," 1993, pp. 21-28.

US Patent and Trademark Office, Office Action for U.S. Appl. No. 12/938,273, Jun. 27, 2012, 11 pages.

* cited by examiner

REAL-TIME MONITORING OF JOB RESOURCE CONSUMPTION AND PREDICTION OF RESOURCE DEFICIENCY BASED ON FUTURE AVAILABILITY

FIELD OF THE INVENTION

The present invention generally relates to the operation of jobs and executable software in a computing environment. The present invention more specifically relates to techniques for predicting and responding to resource usage in computing environments including a general purpose computer and a massively parallel processing computer architecture.

BACKGROUND OF THE INVENTION

It is fairly common for complex scientific applications, such as life science applications, to run jobs for a significantly long time in supercomputers or clustered environments. It may even take days or weeks for a single job to fully execute. Therefore, it is very costly if such application instances or jobs, after running for days, fail because of a lack of adequate system resources in the computing environment. The lack of system resources might result from inadequate hard drive space, memory, CPU cycles, or a variety of other reasons.

Jobs and application commands are commonly executed in high-performance computer systems with the assumption that the system is capable and available to fully process the jobs. Users and systems typically do not perform a check before executing the job to verify that the job will have adequate resources to finish. Further, once a job has started, there is no way to be alerted to decreasing system resources that will affect the job. Techniques are needed to predict job failure and save valuable time, cost, and resources. Techniques are also needed to implement real-time changes in the computing environment and prevent long-running jobs from failing.

BRIEF SUMMARY OF THE INVENTION

One aspect of the present invention includes configuration of a real time, self-predicting job resource monitor. This resource monitor may operate to predict the lack of adequate system resources on computing systems needed to execute the job, such as inadequate hard drive space, memory or CPU capabilities, and the like. In one embodiment, a job resource estimator is configured to process an input file or other input data for a scientific application. The estimator analyzes and returns a set of resource requirements relative to an estimated schedule for the job, such as how much disk space it will require over the entire lifespan of the job. The estimator then predicts the amount of time that will take to complete this job. The job can then be submitted or redirected to the appropriate computing system that meets the resource requirements, or other appropriate action may be taken in connection with the user to ensure that certain failure will not occur.

In one embodiment, periodically during the job run, a monitor may calculate the remaining resources required for complete execution of the job. For example, if the job will require 500 MB disk space and so far the job has written to 100 MB of disk space, then it is estimated that 400 MB disk space will still be needed. If the remaining resources required are not available or are removed from the system, then the job will be paused, and the system administrator may be notified to correct the resource deficiency. The paused job can be resumed or continued after the resource deficiency is met without having to restart the job from the beginning. This prevents jobs from running for days or weeks only to unexpectedly fail due to the lack of system resources. It also saves time and resources by eliminating the need to restart the job from beginning.

Based on the evaluation of the monitor, a variety of actions may be taken. For example, the monitor may be used as a trigger to the environment to free up resources as needed to complete the job. Changes to the job may also occur in conjunction with these actions. An administrator may also be alerted before the resources have become completely exhausted. These and a number of other steps may be taken to predict and prevent a possible failure due to a real-time loss of resources in the computing system.

Another specific embodiment of the present invention provides for a computing system configured with real time self-predicting job resource monitoring features, including a resource estimator, resource monitor, and resource manager enabled to detect and correct resource deficiencies of a job execution consistent with the techniques described herein. Additionally, another specific embodiment of the present invention provides for a computer program product for performing real time self-predicting job resource monitoring within a computer system, with the computer program product comprising a computer readable storage medium having computer readable program code embodied therewith to implement the techniques described herein.

DETAILED DESCRIPTION OF THE INVENTION

Figure 1:
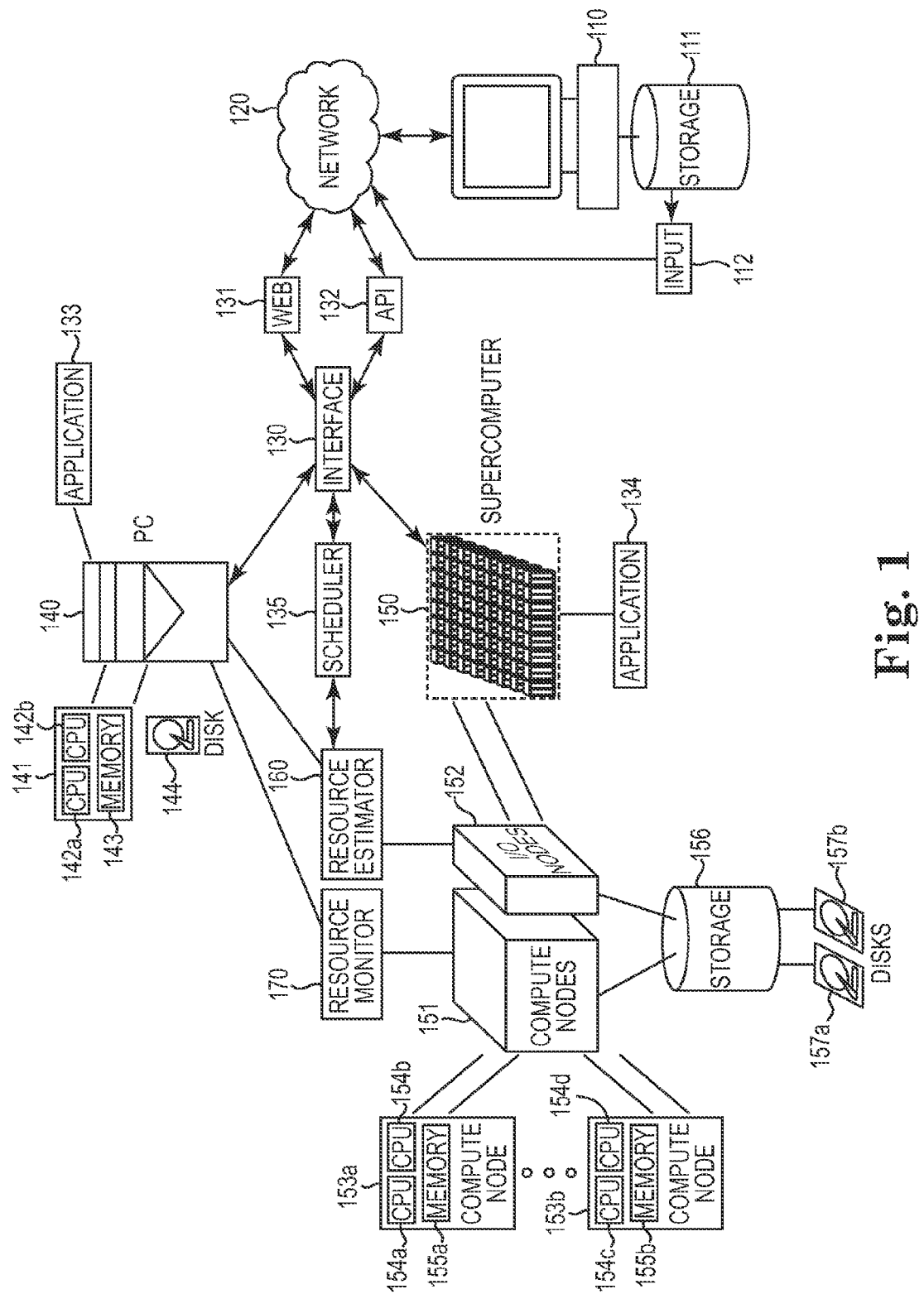
FIG. 1 provides an illustration of an example computer architecture configured for operating the disclosed embodiments of the present invention.

One aspect of the present invention relates to the execution of long-running applications on computing systems. For example, a scientific computer application which processes a large amount of data and performs a high volume of computations may take days or even weeks to compute and finish a single job. The time and computing resources needed to fully execute any given application is dependent on the job input to the application. However, typical users such as scientists and engineers are simply aware of the type and amount of input, but not how the input will be processed in a computing system. Therefore, it is not apparent to users of the computing system what computing resources are needed to fully execute the program, or whether the job is more or less computationally complex than other types of jobs.

Even if the full input of a job or a batch of jobs is understood, the resources and processing capability of computing systems (and especially supercomputer systems) varies significantly based on a given system's configuration. Various embodiments of the present invention integrate use of a resource estimator component to address this concern. The presently described resource estimator may be used to accurately estimate the resource capabilities of a particular computing system, and measure the amount of needed resources for complete execution over a period of time. From this, an accurate estimation of needed resources can be provided and responded to within the computing system before execution of the job begins.

Additionally, while resources are consumed and still needed for execution of the job, the executing job may be monitored to ensure that system resources will not elapse or otherwise be removed from the computing system. As further discussed below, a resource monitoring component may be used to stay apprised of the resource consumption status of the job and ensure that adequate resources remain available throughout execution of the job. This monitoring component may also be configured to recognize when resources are no longer needed by the job at various points in time, preventing false resource depletion alerts and improper actions from occurring.

As discussed below, embodiments of the present invention may be configured to be used in conjunction with a web-based or application programming interface to a supercomputer or massively parallel processing cluster. The presently described resource estimator and resource monitor, for example, may be used in connection with a job launching interface that is initiated from a web browser, web service, application programming interface, or other like external interface.

Typically there is no way of running scientific applications on supercomputers such as IBM Blue Gene from any web browser or any GUI, as a Linux command line terminal is generally the only way to launch and execute applications on these machines. In conjunction with one embodiment of the present invention, a web interface may be provided to connect to the supercomputer or cluster. This interface provides an easy way for non-technical users to interface with customer applications and various back end operating systems that are not otherwise supported by the supercomputer's native environment.

Further, many scientific applications run on Linux, and a typical back end environment may include both a supercomputer and a general purpose Linux system. The web interface and its corresponding processing components may be capable of "smartly" selecting the appropriate supported back end system based on the application that the user wants to run, the input to the application, resource requirements and availability, and various other factors. This enables selection of a lower-cost system (such as the general purpose Linux system) or a high-resource system (such as the supercomputer) as needed by the particular job.

In one embodiment, the web application may be used to receive an input file/data for a computing application. As a non-limiting example, the application to be executed might be a scientific computing application used to analyze molecules of a given chemical composition defined in data input. This received data may be sent to a resource estimator component to analyze and return a set of resource requirements for the particular computing system based on the execution of a job having this input (more specifically, this certain chemical composition).

FIG. 1 depicts an example operational environment for the various resource monitoring and estimating techniques of the presently described invention. As shown, a computing system 110 may be used to provide an input file 112 (or potentially a set of input files) from storage 111 for computation and execution within a job executed by a processing application. As used herein, this "job" may encompass a single job or application execution instance, or a batch of jobs submitted simultaneously. The computing system 110 communicates to one or more interfaces 130 via network 120, such as web interface 131 (further described below), or an application programming interface 132. These interfaces in turn receive the input data 112 and communicate it with one or more processing systems.

The processing systems depicted in FIG. 1 are a general purpose computer 140 (such as a PC) and a supercomputer 150. Those skilled in the art would recognize that both a general purpose computer 140 and supercomputer 150 would provide a varying configuration of hardware and software components. Moreover, a multi-computer system environment is likely to contain a heterogeneous mix of computing systems with differing capabilities and performance characteristics. Each of the general purpose computer 140 and the supercomputer 150 provide an executable platform for instances of the one or more applications 133 and 134 respectively. These applications are used to process the input 112 on one or more processing systems using the appropriate software and hardware components, and produce usable output.

As a further detail of one configuration of general purpose computer 140, this system may include processing hardware 141 including CPUs 142a, 142b and memory 143, and storage disk 144. Likewise, the supercomputer 150 may be comprised of a plurality of I/O nodes 152 and compute nodes 151, with the illustrated compute nodes 153a, 153b each containing multiple CPUs 154a, 154b, 154c, 154d and memory 155a, 155b, and interfaced to a storage volume 156 maintained on storage disks 157a, 157b. Those skilled in the art would recognize that similar configurations of a computing cluster or grid may be substituted for the depicted supercomputer.

As illustrated in FIG. 1, a series of additional components are used to provide resource-related functions and capabilities for the computing systems 140, 150. These components are further described in the following paragraphs, and may include a scheduler 135, a resource estimator 160, and a resource monitor 170.

The techniques required for resource estimation of a job first require that an accurate measurement of the executing computing system's capabilities are fully understood. For example, a certain amount of memory, hard disk space, and processor cycles may be required to execute an application instance in a certain period of time, regardless of the complexity of input for the application.

To accomplish this estimation, in one embodiment the resource estimation component 160 runs or otherwise obtains a series of application-specific benchmarks against the computing hardware. The benchmarks may be based on test runs, actual test runs, or theoretical calculations from simulated test runs of the application on the hardware configuration. The benchmarks can then be used to obtain an accurate resource requirement estimation and a rate of consumption of each particular computing system. Further, benchmarks may be compared or extrapolated to other applications that are executed on the computer system to gain a larger view of the capabilities of a larger computer system and each of the applications that the computer system is capable of executing.

According to the benchmarks of the system and the performance requirements and measurements of a certain application on the system, the resource consumption rate for an application which is required to process the input 112 may be determined. The input 112 can then be analyzed to correlate benchmarking data with the problem size of the input. The goal of this calculation is to provide an accurate measure of job complexity that compares the input with historical application-specific execution information provided by the benchmarking data.

In connection with the web application interface 131 previously described, an example scenario might be conducted as follows. The user goes to a website GUI connected with the web application interface 131, and selects the appropriate application to perform, for instance "Scientific Application 1." Scientific Application 1 specific input fields will be shown. In the website GUI, the user enters the necessary values and uploads the input file(s) to the application, and submits the input file. The appropriate computing system may be manually selected by the user or automatically selected for the user. The web application is then configured to interface with the resource estimator component 160 and scheduler component 135, which collectively function to verify the resource availability of the selected computing system based on the application-specific input file.

The scheduler 135 may verify if it makes sense to run this particular job on a supercomputer such as supercomputer 140 based on the input, or if another lower-cost or lower-power computing environment such as personal computer 150 would be acceptable. In one embodiment, based on the estimation of the resource usage, a series of choices may be provided to the user in a user interface to ask or verify where the user wishes to execute the application.

Alternatively, the decision of which computing system or environment to execute the job may be made automatically by the scheduler 135 having "smart job" capabilities. The scheduler may also automatically select the appropriate execution environment based on consideration of one or more currently executing or scheduled jobs, or resource usage thresholds in connection with resource estimator 160 (and potentially resource monitor 170). After the decision is made, whether manually or automatically, a request is sent to the appropriate back end resource, such as a supercomputer 150 or a general purpose computing machine 140 to execute the job.

In more specific embodiments, the resource requirements for a particular application job may be computed based on the job input as follows. The resource requirements may be represented in a variety of forms and contain multiple sub-requirement values, but for purposes of simplicity, the resource requirements will be referred to in the following sections as $R_{req}$. As a non-limiting example, $R_{req}$ may represent a numerical value of how much disk space a particular instance of the application requires to fully execute. Disk space requirement is a common requirement among long running scientific applications because typically large output files are produced. The size of such output files often depends on the specific input data.

The resource estimator 160 may be configured to, after analyzing the input data, also predict the time that will take to finish this job. This time value will be referred to in the following sections as $T_{req}$. The scheduler 135 can then submit the job to the system that meets the resource requirements $R_{req}$. This verification at the front end allows the minimum system requirements to be compared with the system resource capabilities, and exclude incompatible systems from the outset.

Next, once the job begins execution on the selected system, a real time resource monitor 170 may be used to probe the executing computing system at regular intervals and verify resource availability for the job. This interval time value will be referred to in the following sections as t. t is often a function of $T_{req}$ and can be expressed as: $t=f(T_{req})$. For example, if $T_{req}=50$ hours, t may equal 5 seconds, requiring the monitor to probe the system every 5 seconds until the job finishes.

Figure 2:
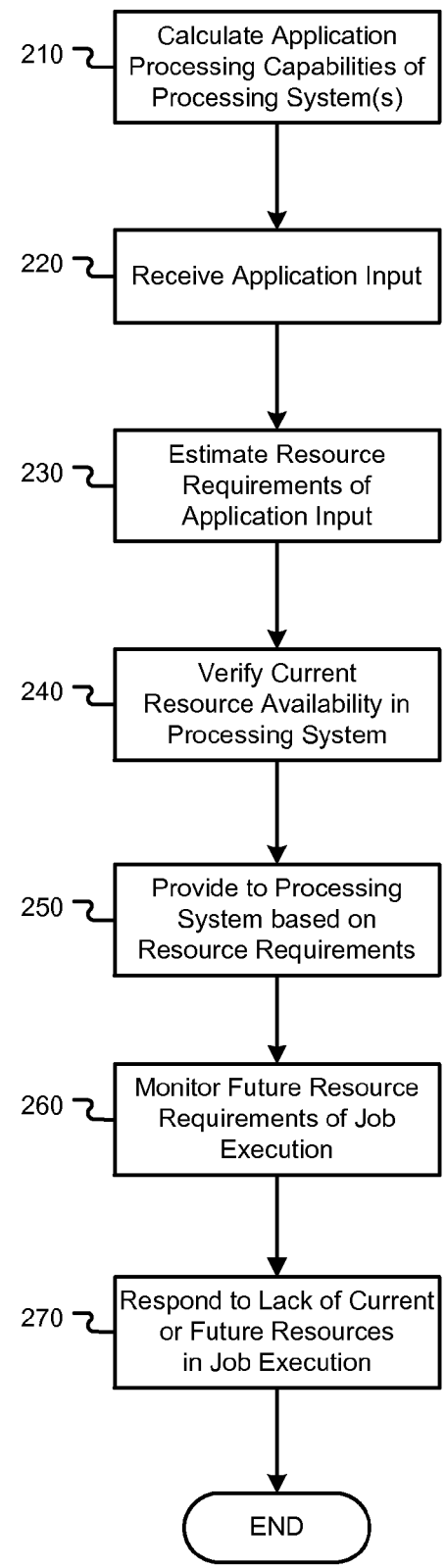
FIG. 2 provides a flowchart providing an example operation for resource estimation and resource monitoring of an application instance in accordance with the disclosed embodiments of the present invention.

FIG. 2 provides a flowchart illustrating the processing generally performed by each of the resource estimator and monitor components in accordance with one embodiment of the present invention. As shown in step 210, the resource estimator operates to calculate the application processing capabilities of available processing systems. Then, as in step 220, the application input is received and processed, and the resource requirements for the particular application input are estimated as in step 230.

Next, the resource estimator operates to verify the current resource availability of each processing system as in step 240. The scheduler then provides the job to the appropriate processing system based on the resource requirements of the job and the capabilities of the system as in step 250. At this point, the job has been submitted and will begin execution on the computer system. One variation is that the scheduler may pause the execution of the job until resources become available, such as for a preferred job or computer system.

Upon the execution of the job instance, the future resource requirements of the job execution are monitored at regular intervals as in step 260. Every time the resource monitor probes the computing system, it may perform a calculation to determine whether the current and future system resources are adequate. If there is a lack of current or future resources, then a response may be initiated as in step 270.

Figure 3:
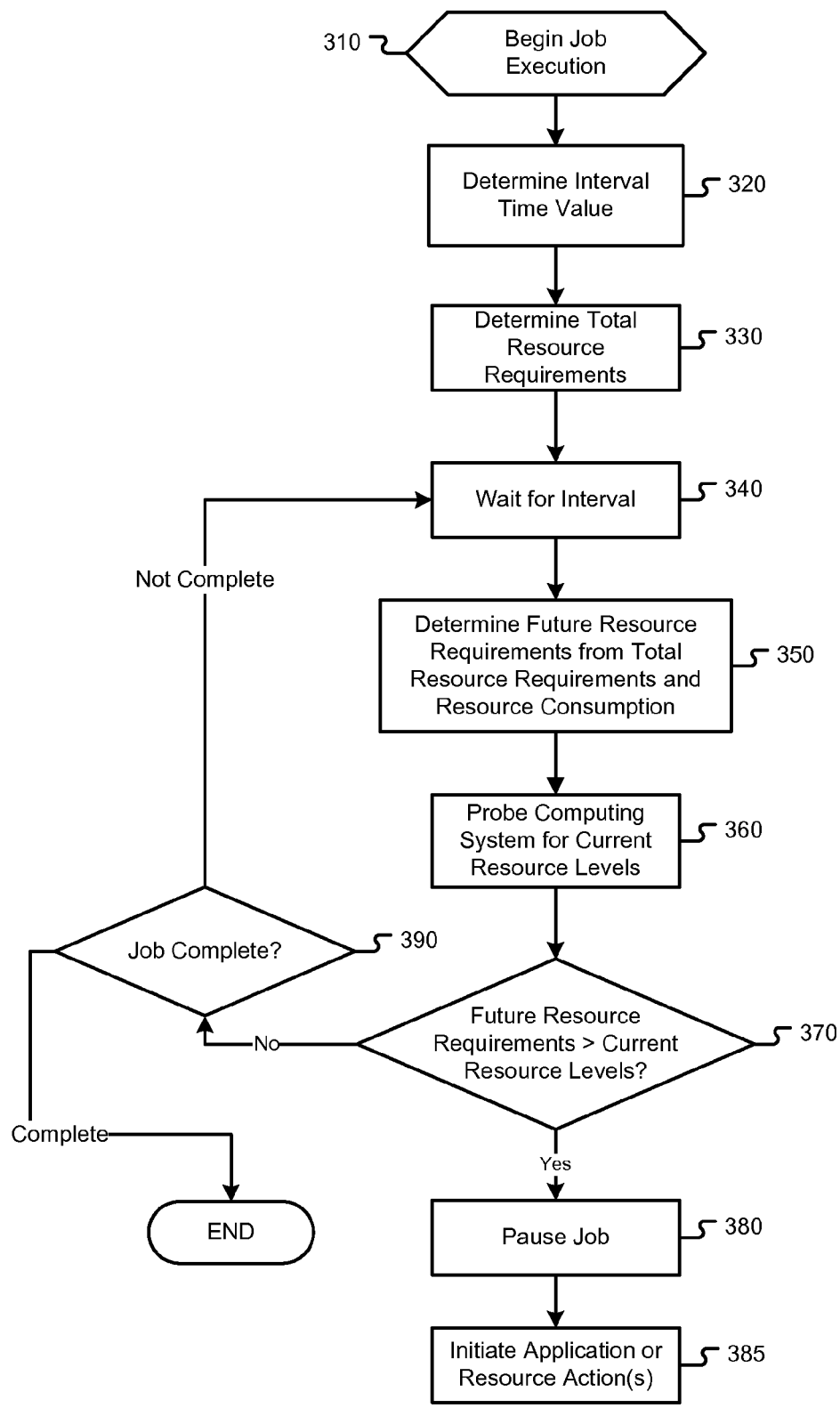
FIG. 3 provides a flowchart providing an example operation for resource monitoring during execution of an application instance in a computing system in accordance with the disclosed embodiments of the present invention.

The verification of future required resources may be a repeated calculation, verifying the total required by the application against the current level of resources. FIG. 3 provides a more detailed illustration of verifying resource requirements during the execution of a job according to one embodiment of the present invention. The following formula for calculating future resources may be computed at a regular interval as follows: x=Resource required ($R_{req}$)–Resource used at time t. If (x>Resource available at time t) then appropriate action may be taken.

Upon execution of the job in step 310, the interval time value for repeating the resource monitoring is determined as in step 320. As previously suggested, this interval time value may be calculated based on the size of the job or the resource requirements of the job. Next, as in step 330, the total resource requirements are determined or obtained. The total resource requirements may be provided by the scheduler or by other components which analyze the job input and the application requirements prior to execution of the job.

Once the job execution has begun, the monitor pauses for the interval time period as in step 340. Once the interval time period elapses, the future resource requirements for the remainder of the job may be computed as in step 350, and the current resource availability for the computing system may be probed and verified as in step 360.

In step 350, the future resource requirements are determined from a derivation of the total resource requirements of the job, and the actual resource consumption of the job measured at the present point in time. These future resource requirements are compared in step 370 to the current resource levels of the computing system. If the future resource requirements are greater than the available current resource levels as in step 370, then various actions need to be performed in order to prevent future failure of the job execution.

For example, as in step 380, the job may be paused indefinitely or for a period of time until resources become available. Alternately or in combination with pausing of the job, the executing user and the system administrator may be alerted. The job may be postponed until necessary actions are taken to allocate additional resources to finish this job successfully as in step 385, after which time the job can be continued. In most scenarios, the job will be paused to provide sufficient time to successfully initiate application or resource actions. In a further embodiment, when the job is paused, all changes and/or work that was performed for the job is saved.

If the future resource requirements are not greater than the current resource levels (and therefore adequate resources are projected to exist in the future), then the job may continue. The monitor waits for the interval time period as in 340 and then repeats the steps of checking the future resource requirements until the job is complete as in step 390.

As an illustrating example, suppose an application requires 500 MB of disk space and needs to run for 50 hours. Assume the system had 800 MB space available at the time the user submits the job, with this amount of available space being calculated before the job was submitted and approved. Assume the job is submitted and runs for 10 hours while consuming 100 MB space. However, during that 10 hour period, some other user, job, or application consumes another 600 MB space from the system.

At this point, the monitor will probe the system as follows: x=Resource required (500 MB disk space)−Resource used after 10 hours (100 MB disk space). x=400 MB. Because (x>resource available at time t, 100 MB) then the monitor will need to initiate corrective action to prevent failure of the job execution. The monitor may automatically initiate actions to pause the job, or otherwise prevent further execution of the job until the appropriate actions are taken to ensure completion of the job. In this disk space example, the appropriate responsive action may require a system administrator to physically add additional hard drives into the system (which may take hours or days to complete). The job may stay paused until the administrator allocates more resources for its successful execution, at which time the user or system administrator may resume the execution of the job. Alternately, the job may automatically resume execution once adequate system resources are detected or predicted.

Thus, the resource monitor may implement real time self predicting characteristics to prevent a failure from happening due to the lack of adequate system resource. This may occur without having to compromise the job or application instance. In one embodiment, the application does not change the runtime behavior of the currently executing job if inadequate resources are discovered. Rather, the environment frees up or otherwise manages resource as needed by the application. This enables functionality beyond simply predicting job completion on the outset, to preventing a possible failure from to real-time loss of resources.

Although a number of example system configurations and techniques have been described above, those skilled in the art would recognize that a number of variations may be adapted to these configurations and techniques. For example, the previously described web application interface may be configured to present results and output produced from the job. After the job is complete the user may access the output files within a browser. This and other graphical user interfaces may be used to present the results and display the status of the job (and its resource consumption) during and after its execution.

Additionally, although multiple computer systems are depicted in connection with the scheduler and benchmarking of system capabilities, use of multiple systems are not required for the resource monitoring techniques. Many aspects of the resource estimation and resource monitoring techniques disclosed herein may apply to a job or application instance executed in a single computer system.

Those skilled in the art would appreciate that other variations to the previously described techniques may be implemented in order to establish real-time monitoring and resource responses. As will also be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although various representative embodiments of this invention have been described above with a certain degree of particularity, those skilled in the art could make numerous alterations to the disclosed embodiments without departing from the spirit or scope of the inventive subject matter set forth in the specification and claims.

What is claimed is:

1. A system for providing real time job resource monitoring of a computer system, comprising:
   one or more processors;
   a resource estimator executing on the one or more processors configured for analyzing input data of a job provided to the computer system and for estimating a total resource requirement representing adequate levels of processing resources in the computer system needed for successful execution of the job, the resource estimator further configured for obtaining a series of application performance benchmarks against the computer system, for determining a resource consumption rate of the job based on the application performance benchmarks, and for estimating a total amount of time required to execute the job on the computer system;
   a resource monitor executing on the one or more processors configured for monitoring adequate processing resources of the computer system throughout execution of the job within the computer system, by:
      measuring cumulative resource consumption for the job and available resource levels in the computer system;
      factoring remaining execution time from the total amount of time required to execute the job on the computer system;
      estimating future resource requirements of the execution of the job based on the remaining execution time, the total resource requirements of the job and the cumulative resource consumption for the job; and
      comparing the future resource requirements of the execution of the job with the available resource levels in the computer system that are projected to exist in the future to predict any resource deficiency; and
   a resource manager executing on the one or more processors configured for implementing one or more corrective actions to prevent failure of the job execution on the computer system responsive to prediction of a resource deficiency, wherein the resource monitor is further configured for monitoring adequate processing resources of the computer system at a predefined interval throughout execution of the job within the computer system, the predetermined interval correlating to one or both of the input data's size and the total resource requirements of the job.

2. The system of claim 1, wherein the resource manager is configured for pausing the job to prevent failure of the job execution on the computer system responsive to prediction of the resource deficiency.

3. The system of claim 1, wherein the resource manager is configured for alerting a user of the resource deficiency to prevent failure of the job execution on the computer system responsive to prediction of the resource deficiency.

4. The system of claim 1, further comprising a scheduler configured for automatically selecting the computer system from a plurality of computer systems for execution of the job based on the input data and the total resource requirements of the job.

5. The system of claim 4, wherein the scheduler is further configured for factoring currently executing or scheduled jobs on the computer system and resource usage thresholds to select the computer system.

* * * * *